(12) United States Patent
Ono et al.

(10) Patent No.: US 7,596,310 B2
(45) Date of Patent: Sep. 29, 2009

(54) FOCUS CONTROL DEVICE, IMAGE PICKUP DEVICE, AND FOCUS CONTROL METHOD

(75) Inventors: Riichi Ono, Tokyo (JP); Shuji Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 497 days.

(21) Appl. No.: 11/352,364

(22) Filed: Feb. 13, 2006

(65) Prior Publication Data
US 2006/0198624 A1    Sep. 7, 2006

(30) Foreign Application Priority Data
Mar. 4, 2005    (JP) .............................. 2005-061119

(51) Int. Cl.
*G03B 13/00* (2006.01)
(52) U.S. Cl. ...................... 396/133; 348/345
(58) Field of Classification Search ................. 396/133; 348/345
See application file for complete search history.

(56) References Cited

U.S. PATENT DOCUMENTS 6,954,233 B1 * 10/2005 Ito .............................. 348/350
2003/0108083 A1 * 6/2003 Seitz ........................... 374/120
2004/0109081 A1 * 6/2004 Sumi ........................... 348/345
2005/0007486 A1 * 1/2005 Fujii et al. ................... 348/345
2005/0046966 A1 * 3/2005 Okawara ..................... 359/696

FOREIGN PATENT DOCUMENTS

| JP | 1-189619 | 7/1989 |
| JP | 3-163408 | 7/1991 |
| JP | 5-236326 | 9/1993 |
| JP | 3401847 | 2/2003 |
| JP | 2004-140479 | 5/2004 |

* cited by examiner

*Primary Examiner*—W B Perkey
*Assistant Examiner*—Fang-Chi Chang
(74) *Attorney, Agent, or Firm*—Oblon, Spivak, McClelland, Maier & Neustadt, L.L.P.

(57) ABSTRACT

A region in a captured image is set as a signal detection region, and signals from an CMOS sensor of the rolling shutter exposure type are detected only in an exposure period corresponding to the signal detection region to produce an evaluated value, after which a focusing lens is moved to a focusing lens position for acquiring a next evaluated value. Since the signal detection region is a partial region in the captured image, a long detection quiescent time is kept between signal detection periods corresponding to every two horizontal synchronizing periods. By moving the focusing lens in the detection quiescent time, the evaluated value is acquired and the focusing lens is moved in each horizontal synchronizing period.

18 Claims, 9 Drawing Sheets

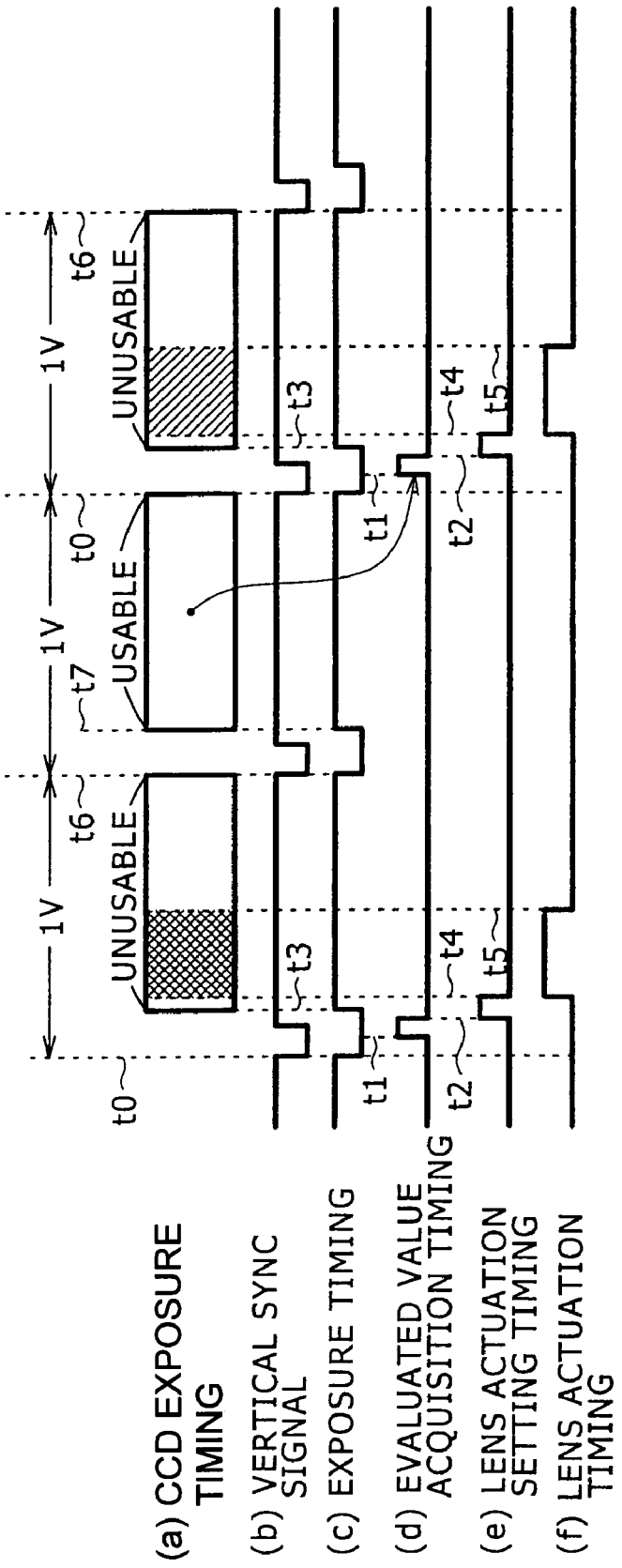

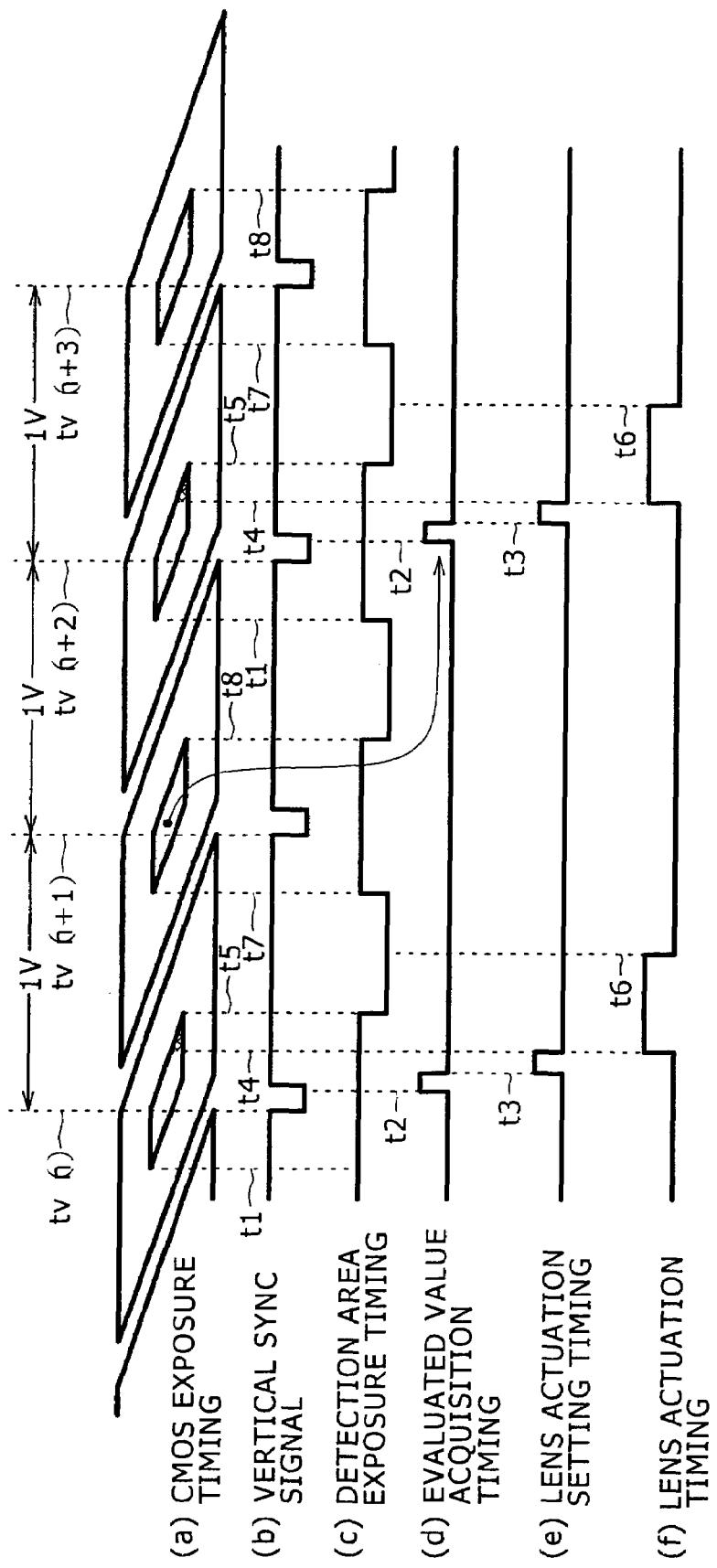

FOCUS CONTROL DEVICE, IMAGE PICKUP DEVICE, AND FOCUS CONTROL METHOD

CROSS REFERENCES TO RELATED APPLICATIONS

The present invention contains subject matter related to Japanese Patent Application JP 2005-061119 filed in the Japanese Patent Office on Mar. 4, 2005, the entire contents of which being incorporated herein by reference.

BACKGROUND OF THE INVENTION

The present invention relates to a focus control device for use in an image pickup device such as a still camera or the like, for controlling the focused state of an image produced by a lens unit, a focus control method for controlling the focused state of such an image, and an image pickup device incorporating such a focus control device therein.

Almost all image pickup devices such as stand-alone digital still cameras, digital still cameras combined with cellular phones, etc. are constructed such that image light from an image capturing lens is focused onto an imager such as a CCD sensor or a CMOS sensor to generate an image signal. Most such image pickup devices have an automatic focusing function. The automatic focusing capability generally refers to an automatic process for controlling the position of a focusing lens to keep the image focused without the need for a manual focusing process. One automatic focusing process which is well known in the art is a contrast method which utilizes the contrast information of an image signal generated from image light from the image capturing lens.

Japanese patent No. 3401847 discloses a circuit for performing an automatic focusing process based on the contrast method. According to the disclosed automatic focusing process, the focusing lens is moved in a focusing direction depending on an evaluated value which corresponds to the contrast of the image signal. The evaluated value is acquired and the movement of the focusing lens is accordingly controlled in synchronism with a vertical synchronizing signal. Even in image pickup devices such as digital still cameras which mainly handle still images, most of processes carried therein including a signal processing process, a camera controlling process, etc. are normally performed in timed relation to one field (frame).

SUMMARY OF THE INVENTION

The above automatic focusing process based on the contrast method is widely used as the automatic focusing function for image pickup devices. However, much remains to be improved in the automatic focusing process.

It is an object of the present invention to provide a focus control device, an image pickup device, and a focus controlling method which are capable of performing an automatic control process efficiently for improved focus control.

According to an aspect of the present invention, there is provided a focus control device including timing generating means for generating an image signal reading timing signal to read an image signal portion corresponding to a to-be-detected region in an entire area of a single captured image, at a focus lens position for acquiring a predetermined evaluated value, and signal reading means for reading the image signal portion corresponding to the to-be-detected region from an image signal representing a single captured image generated by an imager based on the image signal reading timing signal generated by the timing generating means. The focus control device further includes evaluated value acquiring means for generating and acquiring an evaluated value for use in focus control from the image signal read by the signal reading means, and focusing lens movement control means for moving a focusing lens to a focus lens position for acquiring a next predetermined evaluated value at movement start/end times after the image signal portion is read by the signal reading means.

According to another aspect of the present invention, there is provided an image pickup device including a lens unit including a focusing lens, and a focusing lens actuating mechanism for moving the focusing lens. The image pickup device further includes an imager for outputting an image signal representing a captured image, the imager has imaging elements for detecting image light from the lens unit and converting the image light into an electric signal, and timing generating means for generating an image signal reading timing signal to read an image signal portion corresponding to a to-be-detected region in an entire area of a single captured image, at a focus lens position for acquiring a predetermined evaluated value. The image pickup device still further includes signal reading means for reading the image signal portion corresponding to the to-be-detected region from an image signal representing a single captured image generated by the imager based on the image signal reading timing signal generated by the timing generating means, evaluated value acquiring means for generating and acquiring an evaluated value for use in focus control from the image signal read by the signal reading means, and focusing lens movement control means for controlling the focusing lens actuating mechanism to move the focusing lens to a focus lens position for acquiring a next predetermined evaluated value at movement start/end times after the image signal portion is read by the signal reading means.

According to still another aspect of the present invention, there is provided a focus control method including the steps of (a) generating an image signal reading timing signal to read an image signal portion corresponding to a to-be-detected region in an entire area of a single captured image, at a focus lens position for acquiring a predetermined evaluated value, (b) reading the image signal portion corresponding to the to-be-detected region from an image signal representing a single captured image generated by an imager based on the image signal reading timing signal generated in the step (a), (c) generating and acquiring an evaluated value for use in focus control from the image signal read in the step (b), and (d) moving a focusing lens to a focus lens position for acquiring a next predetermined evaluated value at movement start/end times after the image signal portion is read in the step (b).

With the arrangement of the present invention, for acquiring an evaluated value for automatic focusing control, an image signal portion corresponding to a to-be-detected region which is a partial region in an entire area of a single captured image is read as a basis for the evaluated value, and a timing signal for reading the image signal portion is generated.

Reading the image signal portion corresponding to the to-be-detected region means that the reading of the image signal portion is completed in a shorter period than if the image signal corresponding to the entire area of a single captured image is read. Consequently, a period after the image signal portion corresponding to the to-be-detected region in a preceding captured image has been read and until the image signal portion corresponding to the to-be-detected region in a next captured image starts to be read, is longer than if the image signal corresponding to the entire area of a single captured image is read. If a period for reading the image signal portion corresponding to the to-be-detected region is regarded as a necessary exposure period required for acquiring an evaluated value, then the time of an unnecessary exposure period after the preceding necessary exposure period is finished and until the next necessary exposure period begins is increased. It is thus possible to reliably set a period for moving the focusing lens in such an unnecessary exposure period. Heretofore, it has been impossible to reliably set a period for moving the focusing lens in an unnecessary exposure period.

Since a period for moving the focusing lens can be set in an unnecessary exposure period, the time required to bring the focusing lens into a focused state according to an automatic focusing control process is shortened. Therefore, the automatic focusing control process is speeded up and made more efficient than heretofore.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a timing chart of a conventional successive evaluated value sampling process; and FIG. 10 is a timing chart of the conventional successive evaluated value sampling process as it is applied to a CMOS sensor for rolling-shutter exposure.

DETAILED DESCRIPTION OF THE PREFERRED EMBODIMENTS

First, the background of the invention will be described below.

A contrast method is known in the art for use in an automatic focusing process. According to the contrast method, the level of contrast of an image signal generated based on image light detected by an imager is evaluated in the manner well known in the art. A higher level of contrast of the image signal indicates better focus of the image of a subject which is captured by the imager. The focusing lens is moved based on the evaluated level of contrast of the image signal to bring the image of the subject into focus.

One general known process of evaluating the contrast of an image signal will be described below.

The contrast of an image signal is evaluated using a luminance signal of the image signal. Specifically, the amplitude of the luminance signal is passed through a HPF (High Pass Filter) having predetermined characteristics, i.e., the amplitude of the luminance signal is differentiated, to produce the absolute value of the amplitude (differentiated absolute value) depending on the high-frequency component of the luminance signal. Then, the maximum values of differentiated absolute values produced in given signal intervals such as horizontal lines of the image signal are determined, and the determined maximum values are integrated. The value (integrated value) produced when maximum values of an image signal corresponding to one frame, for example, are integrated is handled as an evaluated value of the contrast of the image signal.

As described above, the evaluated value is obtained based on the high-frequency component of the luminance signal of the image signal, and hence represents the intensity of contrast in a certain image area.

An automatic focusing process which employs the evaluated value thus produced will be described below with reference to FIG. 8. The automatic focusing process to be described below is widely used with respect to still images to be captured by still cameras.

Figure 8:
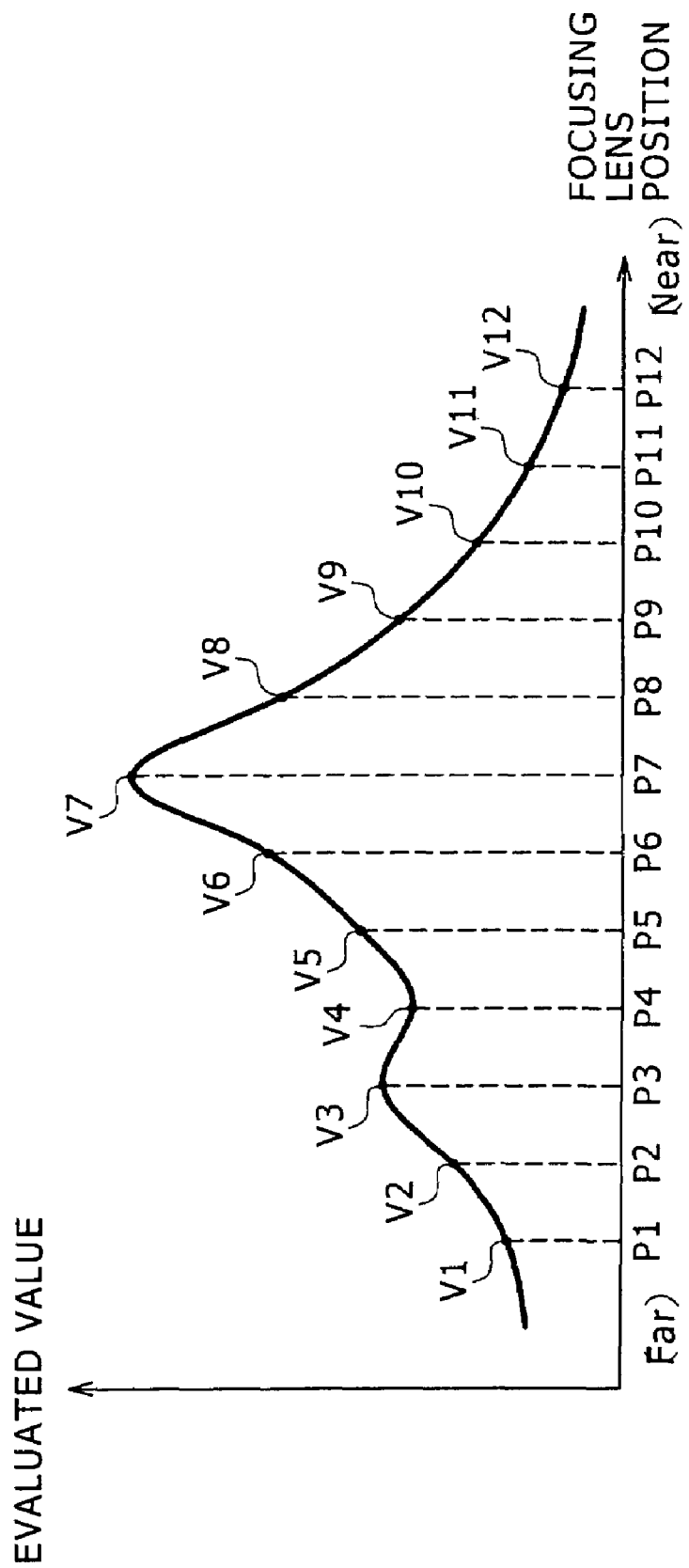
FIG. 8 is a diagram illustrative of a successive evaluated value sampling process in an automatic focusing process based on a contrast method, by way of the relationship between focusing lens positions and evaluated values.

FIG. 8 shows the relationship between evaluated values produced from an image signal (it is assumed for the sake of brevity that the image signal has no time-dependent changes) and lens positions of a focusing lens (focusing lens positions). It is known in the art that the evaluated values are represented by an upwardly convex curve having a vertex at a focusing lens position which corresponds to a focused state.

According to the automatic focusing process, the focusing lens is placed successively in different lens positions at respective predetermined distances within a given movable range of the focusing lens, and evaluated values are produced respectively when the focusing lens is placed successively in those different lens positions. Adjacent ones of the lens positions may be spaced from each other by equal or different distances.

In FIG. 8, the different lens positions in the movable range of the focusing lens are represented by P1 through P12 as the distance up to the subject varies from a far side to a near side. If the focusing lens starts being successively positioned from the far side toward the near side, then the focusing lens is first placed in the lens position P1. An evaluated value V1 is obtained while the focusing lens is being held in the lens position P1. Then, the focusing lens is moved from the position P1 to the position P2, and an evaluated value V2 is obtained while the focusing lens is being held in the lens position P2. Similarly, the focusing lens is moved successively to the lens positions P3 through P12, and respective evaluated values V3 through V12 are obtained while the focusing lens is being held in the respective lens positions P3 through P12.

By thus successively scanning the lens positions P1 through P12, the evaluated values are sampled in those lens positions. Such a process will hereinafter be referred to as "successive evaluated value sampling process". The successive evaluated value sampling process that is performed as shown in FIG. 8 produces the twelve evaluated values V1 through V12. A comparison of these twelve evaluated values V1 through V12 indicates that the maximum value thereof is the evaluated value V7, showing that the lens position P7 is the focused focal point where the evaluated value V7 is produced.

Thus, in this case, the focus lens is moved to the position P7 so that the image produced from the focusing lens is focused.

In FIG. 8, the twelve evaluated values V1 through V12, i.e., the twelve lens positions P1 through P12, are shown for illustrative purposes. However, the actual number of evaluated values or sampled values should be selected depending on the specifications of the actual image pickup device and the performance of the automatic focusing process that is actually required.

At present, widely known imagers for converting captured image light into an electric signal include a CCD (Charge Coupled Device) imager and a CMOS imager (CMOS sensor). Imagers that are widely employed in actual image pickup devices are CCD imagers.

As well known in the art, a CCD sensor comprises an array of photoelectric transducers which represent respective pixels, and all the photoelectric transducers have the same exposure timing. Such exposure timing is referred to as global shutter. Generally, various imaging control processes in image pickup devices are performed in synchronism with vertical synchronizing signal timing. The vertical synchronizing signal timing is timing corresponding to a period in which one image frame is generated, and corresponds to exposure end timing in a CCD sensor.

The successive evaluated value sampling process for the automatic focusing process as shown in FIG. 8 is also normally carried out with the timing based on the vertical synchronizing signal. FIG. 9 is a timing chart of an operation sequence of an image pickup device for a successive evaluated value sampling process where the image pickup device has an imager comprising a CCD sensor.

As shown at (b) in FIG. 9, a vertical synchronizing signal has a waveform having a low-level vertical synchronizing pulse in each vertical synchronizing period 1V. One vertical synchronizing period extends from a time t0 when the negative-going edge of a vertical synchronizing pulse occurs to a time t6 when the negative-going edge of a next vertical synchronizing pulse occurs. (Similarly, one vertical synchronizing period is from the time t6 to the time t0)

When a vertical synchronizing period begins at time t0 or a preceding vertical synchronizing period ends at t0, a period from a time t1 immediately after the time t0 to a time t2 is set as an evaluated value acquisition timing, as shown in at (d) in FIG. 9. In the evaluated value acquisition timing as the period t1 to t2, the CCD sensor is energized to read charges accumulated in the CCD sensor that was exposed in the preceding vertical synchronizing period 1V, producing an image signal of one captured image. An evaluated value is acquired using the luminance signal of the produced image signal according to the process described above.

When the acquisition of the evaluated value is finished at the time t2, a period from the time t2 to a time t4 is set as a timing for setting predetermined items for moving the focusing lens to a next lens position. In this period, a moving speed, a traveled distance, and a moving direction are set as the predetermined items for moving the focusing lens in the set moving direction at the set moving speed over the set traveled distance.

Thereafter, a period from the time t4 to a time t5 is set for setting predetermined items for moving the focusing lens to a next lens position in order to acquire a next evaluated value sample, as shown at (f) in FIG. 9. In this period, the focusing lens is moved to the next lens position in the moving direction at the moving speed over the traveled distance which have been set in the period t2 through t4.

The CCD sensor is exposed to image light at a timing in each vertical synchronizing period, as shown at (c) in FIG. 9. The exposure timing is represented by a high-level interval where the exposure is effective and a low-level interval where the exposure is ineffective. Specifically, the high-level interval of the exposure timing extends from a time t3 which is a certain period after the time t0 when the vertical synchronizing period 1V begins to the time t6 when the vertical synchronizing period 1V ends. Therefore, the CCD sensor is exposed to the image light in the period t3 to t6. The exposure timing of the CCD sensor in this period is illustrated at (a) in FIG. 9.

According to the above description, the focusing lens is actually moved in the period t4 to t5 in the vertical synchronizing period 1V that starts from the time t0. Therefore, the exposure period represented as the period t3 to t6 overlaps the focusing lens moving period represented as the period t4 to t5.

In order to obtain an appropriate evaluated value, the focusing lens needs to be stopped, rather than moved, in the exposure period for producing the image signal to be processed to acquire the evaluated value. Moving the focusing lens in the exposure period means that the focused state is forcibly changed by the camera, and the image signal is processed as if passed through an LPF (Low Pass Filter) for obtaining the evaluated value. The evaluated value thus obtained is not proper.

Even if the automatic control process is performed using the improper evaluated value, the image cannot appropriately be focused. Therefore, the improper evaluated value cannot be used in the automatic control process.

Consequently the evaluated value obtained from the image signal that is generated in the exposure period t3 to t6 is not proper, and hence no evaluated value should be acquired from the image signal that is generated in the exposure period t3 to t6.

For this reason, as shown at (d) in FIG. 9, no evaluated value is acquired in the vertical synchronizing period 1V starting from the time t6 after the vertical synchronizing period 1V starting from the time t0.

In the vertical synchronizing period 1V starting from the time t6, no lens movement settings are made as shown at (e) in FIG. 9, and the focusing lens is not actually moved as shown at (f) in FIG. 9.

The exposure of the CCD sensor is periodically performed in each vertical synchronizing period. As shown at (a) and (c) in FIG. 9, in the vertical synchronizing period 1V starting from the time t6, the CCD sensor is exposed in a period from a time t7 which is a certain period after the time t6 to a time t0 when the vertical synchronizing period 1V ends.

In the vertical synchronizing period 1V starting from the time t6, therefore, while the focusing lens is not moved, the CCD sensor is exposed in the period t7 to t0. An image signal generated in the exposure period t7 to t0 is effective for obtaining an evaluated value. In the vertical synchronizing period 1V starting from the next time t0, an evaluated value is obtained from the image signal generated in the exposure period t7 to t0 in a period t1 to t2. Depending on the obtained evaluated value, lens movement settings are made in a period t2 to t4, and the focusing lens is moved in a period t4 to t5.

The above cycle is repeated to perform the successive evaluated value sampling process illustrated above with reference to FIG. 8.

According to the successive evaluated value sampling process shown in FIG. 9, an evaluated value is sampled in every two vertical synchronizing periods 1V+1V. This is because in one of the two vertical synchronizing periods, the exposure period of the CCD sensor overlaps the focusing lens moving period, making it impossible to produce an appropriate evaluated value.

Consequently, the successive evaluated value sampling process for the automatic focusing control process illustrated above with reference to FIG. 8 requires a time of 2V×n where V represents the time length of one vertical synchronizing period and n the number of evaluated value samples.

However, because the CCD sensor is exposed in each vertical synchronizing period, if an evaluated value is sampled also in each vertical synchronizing period, then the time required by the successive evaluated value sampling process is represented essentially by V×n and can be reduced to about one half the time required to perform the successive evaluated value sampling process shown in FIG. 9. According to the automatic focusing control process shown in FIG. 8, the focusing lens is moved to a lens position where the maximum evaluated value is sampled after the successive evaluated value sampling process is completed. Therefore, the proportion of the time required by the successive evaluated value sampling process in the overall automatic focusing control process is large. If the time required by the successive evaluated value sampling process is reduced, then the time that is consumed after the automatic focusing control process starts until it ends can also be greatly shortened.

If a proper evaluated value can be sampled in each vertical synchronizing period 1V based on the successive evaluated value sampling process shown in FIG. 9, then the exposure time of the CCD sensor may be reduced.

The exposure of the CCD sensor is synchronized with a vertical synchronizing period when the timing to end the exposure of the CCD sensor is in conformity with the timing to end the vertical synchronizing period. Therefore, changing the exposure time of the CCD sensor results in a change in the time to start exposing the CCD sensor. For example, if the time t3 when the CCD sensor starts to be exposed is delayed to a time equal or subsequent to the time t4, then the period t3 to t6 is shortened and the period from the time equal or subsequent to the time t4 to the time t3 when the CCD sensor starts to be exposed is shortened. The shortened period from the time equal or subsequent to the time t4 to the time t3 when the CCD sensor starts to be exposed is used as a time period for moving the focusing lens.

In this case, in order to obtain a sufficient time period for moving the focusing lens, the exposure time may be excessively shortened, failing to achieve a necessary amount of exposure. Since the maximum exposure time is shortened, the range in which the exposure time is variable is reduced, making the image capturing function impractical.

If the time period for moving the focusing lens is shortened, conversely, then the exposure time is increased. However, since the focusing lens is physically moved, a certain time period is necessarily required to move the focusing lens. The focusing lens is normally moved by a motor, and the physical structure of the motor makes it difficult to start and stop moving the focusing lens instantaneously. For these reasons, the time period for moving the focusing lens needs to be of a certain duration.

Therefore, it is difficult according to the successive evaluated value sampling process shown in FIG. 9 to sample an evaluated value in each vertical synchronizing period while keeping the image capturing function practical. According to the present invention, there is proposed an automatic focusing control process capable of sampling an evaluated value in each vertical synchronizing period while keeping the image capturing function practical.

Figure 1:
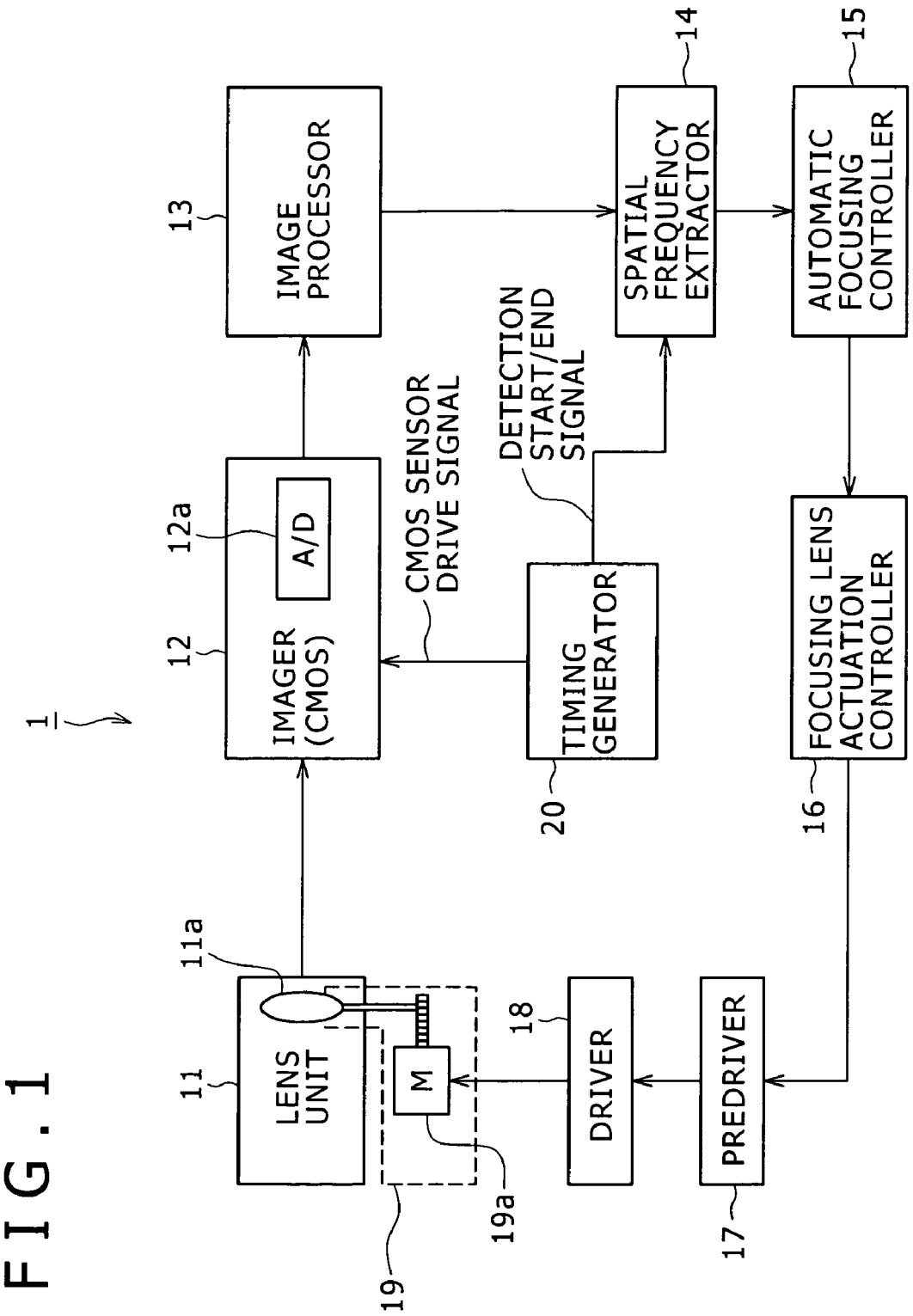
FIG. 1 is a block diagram of an image pickup device according to an embodiment of the present invention.

FIG. 1 shows in block form an image pickup device according to an embodiment of the present invention. The image pickup device, generally denoted by 1 in FIG. 1, is a digital still camera for processing the data of a captured still image. In FIG. 1, functions of the image pickup device according to the embodiment are illustrated.

A lens unit 11 includes an optical lens system, a shutter mechanism, an iris mechanism, etc. The lens unit 11 serves to focus image light that is applied onto a light-detecting surface of an imager 12. The optical lens system of the lens unit 11 has a focusing lens 11a for performing focus adjustment. The focusing lens 11a is actuatable by a focusing mechanism 19 to move along an optical axis thereof. The focusing mechanism 19 comprises a focusing motor 19a and various gears, not shown, combined therewith. The focusing motor 19a is energized by a drive signal output from a driver 18 to move the focusing lens 11a. When the focusing lens 11a is thus moved to adjust its position, the focus of image light produced by the lens unit 11 is adjusted to keep an image focused on the light-detecting surface of the imager 12.

Although not shown, the lens unit 11 may have a zoom lens which may be actuated by a zooming mechanism to change the angle of field of the image. The shutter mechanism and the iris mechanism of the lens unit 11 can also be controlled to change the shutter speed and the aperture. The mechanisms of the lens unit 11 are controlled by a control system of the digital still camera.

The imager 12 comprises an array of photoelectric transducers (imaging elements). The imager 12 converts image light applied from the lens unit 11 and focused onto the light-detecting surface into an electric signal, and performs AGC (Automatic Gain Control) on the electric signal. The electric signal is then converted by an A/D converter 12a into a digital image signal, which is output to an image processor 13.

CCD sensors and CMOS sensors are available for use as the imager 12. According to the embodiment, the imager 12 comprises a CMOS sensor.

The CMOS sensors are more advantageous than CCD sensors in that they are free of smear which is most responsible for poor image quality and consume lower electric energy than the CCD sensors. In recent years, because the S/N ratio per unit area of CMOS sensors has been improved in recent years, CMOS sensors has begun being widely used as imagers.

The imager 12 is energized by a CMOS sensor drive signal generated and output by a timing generator 20 to expose the CMOS sensor and output an image signal at times indicated by the CMOS sensor drive signal.

The image processor 13 generates digital image data as a still image or a moving image based on the digital image signal supplied from the imager 12. The image processor 13 also performs camera signal processing processes such as an AE (Automatic Exposure) process, an AWB (Automatic White Balancing) process, etc. on the digital image data.

The image processor 13 also performs data compression coding according to a predetermined compression process and recording coding on the processed digital image data, and transfers the digital image data to a predetermined recording medium where the digital image data is recorded in a format that is manageable as a file.

The image processor 13 is also capable of performing a video signal processing process on the digital image data for displaying a monitor image of the captured image on a display unit (not shown) of the image pickup device.

Now, an arrangement of the image pickup device 1 for performing an automatic focusing control process will be described below. The image pickup device 1 employs the contrast method for the automatic focusing control process. The automatic focusing control process based on the contrast method is the same as the automatic focusing control process described above with reference to FIG. 8. According to the automatic focusing control process, a certain number of evaluated values are sampled in a predetermined range of lens positions, and the focusing lens 11a is moved to one of the lens positions which corresponds to the greatest one of the evaluated values acquired by a successive evaluated value sampling process.

A spatial frequency extractor 14 reads the digital image signal supplied from the imager 12 to the image processor 13 at a time indicated by a detection start/end signal output from the timing generator 20. Specifically, the spatial frequency extractor 14 reads a luminance signal of the digital image signal.

Based on the read luminance signal, the spatial frequency extractor 14 performs a process of acquiring evaluated values for performing the automatic focusing control process. The process of acquiring evaluated values may be of conventional nature. For example, as described above, the amplitude of the luminance signal is passed through a HPF, i.e., the amplitude of the luminance signal is differentiated, to produce the absolute value of the amplitude in each given signal interval (each horizontal line). Then, the maximum values of differentiated absolute values produced in the given signal intervals are integrated to produce an evaluated value. The evaluated value thus produced represents the contrast of an image produced based on the image signal. Thus, the information of a spatial frequency is extracted from the image produced based on the image signal.

An automatic focusing controller 15 performs predetermined processes and calculations for the automatic focusing control process based on the evaluated value output from the spatial frequency extractor 14.

A focusing lens actuation controller 16 instructs a predriver 17 for actually actuating the focusing lens 11a under the control of the automatic focusing controller 15. When the automatic focusing controller 15 is to move the focusing lens 11a, for example, the automatic focusing controller 15 sets a moving speed, a traveled distance, and a moving direction for moving the focusing lens 11a based on the information of the evaluated value acquired so far. Then, the automatic focusing controller 15 instructs the focusing lens actuation controller 16 to move the focusing lens 11a in the moving direction at the moving speed over the traveled distance which have been set.

The focusing lens actuation controller 16 establishes parameters for moving the focusing lens 11a in the moving direction at the moving speed over the traveled distance and sets the parameters in the predriver 17. The predriver 17 generates a drive signal depending on the set parameters, and outputs the drive signal to the driver 18. The driver 18 converts the drive signal into a current and a voltage for energizing the focusing motor 19a, and supplies the current and the voltage to the focusing motor 19a. The focusing motor 19a is energized to move the focusing lens 11a in the moving direction at the moving speed over the traveled distance that have been set by the automatic focusing controller 15.

Practically, at least one of the spatial frequency extractor 14, the automatic focusing controller 15, the focusing lens actuation controller 16, and the timing generator 20 may be implemented as a process performed by a CPU according to a program. Specifically, the image pickup device 1 has a hardware arrangement comprising a microcomputer including a CPU, a RAM, a ROM, etc., and the microcomputer functions as a controller for controlling the image pickup device 1 in its entirety. If the functions of the spatial frequency extractor 14, the automatic focusing controller 15, the focusing lens actuation controller 16, and the timing generator 20 are described as a program, and the program is executed by the CPU, then their operation described above is obtained as a process performed by the CPU. The program may be stored in the ROM of the microcomputer. The CPU loads the program stored in the ROM into the RAM, and executes the program stored in the RAM. The timing generator 20 may be of a hardware arrangement comprising a logic circuit for generating a timing signal depending on a trigger signal output from the controller.

According to the automatic focusing control process based on the contrast method that is performed by the image pickup device 1, as described above, a lens position for providing a focused position is determined based on an evaluated value produced by the successive evaluated value sampling process, and the focusing lens 11a is moved to the determined lens position.

Figure 2:
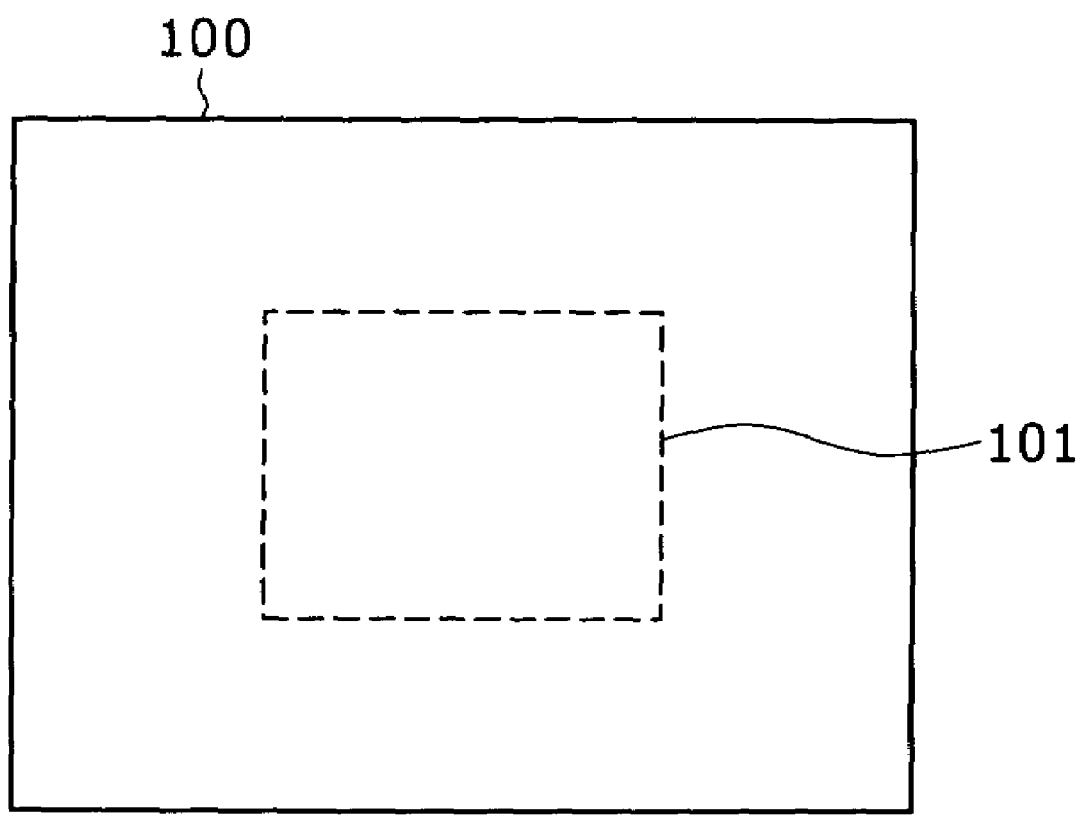
FIG. 2 is a view showing an example of a spatial frequency extracting area that is set in an image capturing area.

According to the present embodiment, as shown in FIG. 2, a partial region in an imaging area 100 which corresponds to an entire image captured by the lens unit 11 is set as a spatial frequency extracting area (detecting area: to-be-detected region) 101. The spatial frequency extracting area 101 corresponds to an image capturing signal zone (which may be regarded as a cluster of pixels) to be read by the spatial frequency extractor 14 for acquiring evaluated values.

In FIG. 2, the spatial frequency extracting area 101 is shown as positioned at the center of the imaging area 100. However, the spatial frequency extracting area 101 may be differently positioned. The spatial frequency extracting area 101 may have its size changed depending on various conditions. Since the spatial frequency extracting area 101 represents a captured image region to be processed by the automatic focusing control process, the spatial frequency extracting area 101 should preferably be positioned centrally in the imaging area 100 for better signal processing. The size of the spatial frequency extracting area 101 should be selected in order to obtain practically sufficient operation and performance of the automatic focusing control process and also to obtain a necessary time duration as lens actuation timing. In some cases, the size of the spatial frequency extracting area 101 may be made variable in a certain range at user's choice.

Figure 3:
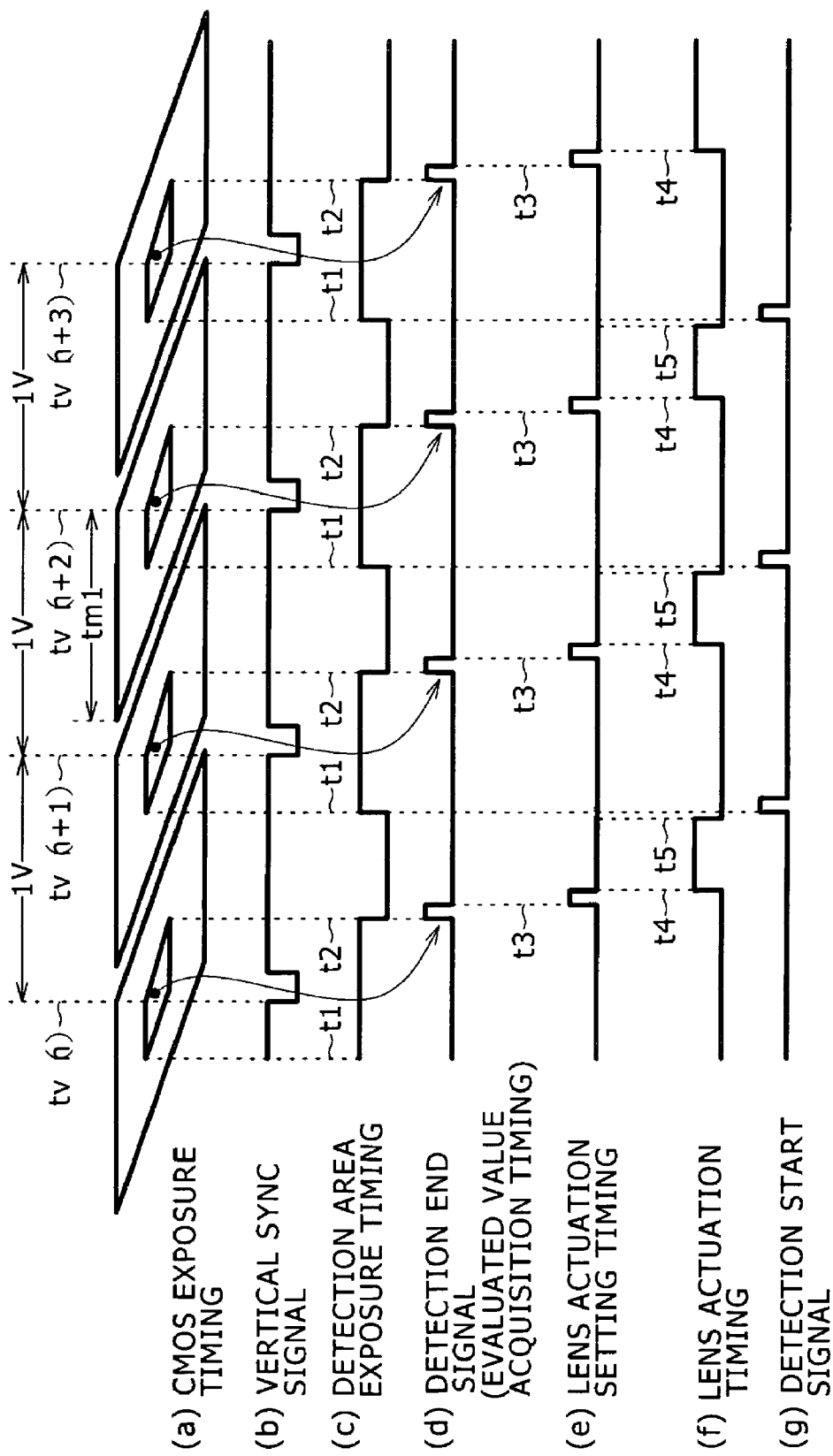
FIG. 3 is a timing chart of a successive evaluated value sampling process for a longer exposure time.

According to the present embodiment, the successive evaluated value sampling process in the automatic focusing control process is performed according to the timing shown in a timing chart of FIG. 3. The successive evaluated value sampling process may basically be the same as the successive evaluated value sampling process described above with reference to FIG. 8. That is, the focusing lens is placed successively in different lens positions within a given movable range of the focusing lens, and evaluated values are produced respectively when the focusing lens is placed successively in those different lens positions.

FIG. 3 shows at (a) how the CMOS sensor of the imager 12 is exposed.

With the CCD sensor, all the pixels or photoelectric transducers have the same exposure timing, called global shutter. However, the CMOS sensor may be exposed according to rolling shutter (focal shutter). The imager 12 according to the present embodiment is also exposed according to rolling shutter as it comprises a CMOS sensor.

According to the rolling shutter process, as well known in the art, a matrix of photoelectric transducers or pixels is scanned sequentially line by line for exposure. Specifically, one horizontal line is selected and the potentials of the pixels of the selected horizontal line are sequentially read. The pixels from which the potentials have been read are reset and exposed again. Then, a next horizontal line adjacent to the previously selected horizontal line is selected, and the potentials of the pixels are sequentially read, after which the pixels are reset. With the exposure timing according to the sequential line scanning, the period of time after the pixels of one horizontal line are reset and start being exposed until their data are read represents an exposure time.

According to the present embodiment, the exposure of an overall captured image according to the rolling shutter process is performed in timed relation to each vertical scanning period in synchronism with a vertical synchronizing signal. This exposure timing is represented by the relationship between the CMOS sensor exposure timing shown at (a) in FIG. 3 and the vertical synchronizing signal shown at (b) in FIG. 3.

Since the CMOS sensor is exposed by a sequential line-by-line scanning process, the exposure timing is delayed a certain time for each pixel. When the exposure timing is repeated, the exposure of the first pixel in one captured image is started following the final pixel in a preceding captured image. Therefore, the exposure timing of the CMOS sensor is time-related as shown at (a) in FIG. 3. According to the exposure timing for successive captured images, the final pixels are read and reset in synchronism with the respective negative-going edges of vertical synchronizing pulses at respective times tv(n), tv(n+1), tv(n+2), tv(n+3). Therefore, the exposure timing for each of the successive captured images is synchronized with the vertical synchronizing period 1V.

As shown in FIG. 2, the spatial frequency extracting area 101 is set in the imaging area 100. The spatial frequency extracting area 101 as it is related to the exposure timing shown at (a) in FIG. 3 appears as a smaller lozenged shape that is positioned in a larger lozenged shape which represents the exposure timing of each captured image.

According to the present embodiment, an image signal corresponding only to the spatial frequency extracting area 101 is extracted to acquire an evaluated value. The imager 12 performs the basic exposure operation as shown at (a) in FIG. 3 according to the rolling shutter process. An image signal (detected signal) that is actually required to acquire an evaluated value is a cluster of signals in a zone corresponding to the horizontal lines in the spatial frequency extracting area 101. For efficiently reading only those signals in the exposure timing for one captured image, signals for actually calculating an evaluated value may start to be read (hereinafter referred to as "detected") at the time the data of a first exposed horizontal line of the horizontal lines included in the spatial frequency extracting area 101 is read, and may end to be detected at the time the data of a final exposed horizontal line is read.

The timing to detect those signals is shown at (c) in FIG. 3. The signals start to be detected at a time t1 and end to be detected at a time t2. Therefore, the width in the horizontal direction of the lozenge shape of the spatial frequency extracting area 101 represents a period required to detect the signals.

With the signal detection period being thus set, a relatively long detection quiescent time, i.e., an unnecessary exposure period t2 to t1, is provided between adjacent signal detection periods t1 to t2. According to the present embodiment, the focusing lens is moved for the successive evaluated value sampling process as follows:

Based on the signal detection period set as shown at (c) in FIG. 3, the timing of detection start and end signals is set as shown at (g), (d) in FIG. 3. Specifically, the detection start signal has pulses each having a positive-going edge at the time t1 and the detection end signal has pulses each having a positive-going edge at the time t2. The imager 12 outputs a digital image signal of an entire image, and the image processor 13 outputs the digital image signal to the spatial frequency extractor 14 at the timing shown at (a) in FIG. 3. The spatial frequency extractor 14 starts to read the data of the digital image signal from the image processor 13 in timed relation to the positive-going edge of each pulse of the detection start signal, and ends to read the data of the digital image signal in timed relation to the positive-going edge of each pulse of the detection end signal. Therefore, the spatial frequency extractor 14 starts reading the data of the digital image signal at the first exposed pixel in the spatial frequency extracting area 101, and ends reading the data of the digital image signal at the finally exposed pixel in the spatial frequency extracting area 101. At this time, all the data of the pixels in the spatial frequency extracting area 101 have been read.

After the spatial frequency extractor 14 has read the data of the digital image signal at the time t2, the spatial frequency extractor 14 extracts the data of the pixels making up the spatial frequency extracting area 101, i.e., the signals on the horizontal lines making up the spatial frequency extracting area 101, from the image signal (detected signal) in a period t2 to t3, and performs a process of obtaining an evaluated value from the extracted data. The process of obtaining an evaluated value may be the conventional process described above with reference to FIG. 8. Specifically, the amplitude of the luminance signal of the signal on each of the horizontal lines making up the spatial frequency extracting area 101 is differentiated, and to produce the absolute value of the amplitude. Then, the absolute values of the amplitudes of the signals on the horizontal lines are integrated to produce an evaluated value.

Then, a period from the time t3 when the calculation of the evaluated value is completed to a time t4 is set as a timing for setting predetermined items for moving the focusing lens to a next lens position. In this period, the focusing lens actuation controller 16 sets a moving speed, a traveled distance, and a moving direction as the predetermined items for moving the focusing lens 11a in the set moving direction at the set moving speed over the set traveled distance.

In a period from the time t4 at the end of the period for setting the lens actuation settings to a time t5, the focusing lens 11a is actually moved as shown at (f) in FIG. 3. To move the focusing lens 11a, the focusing lens actuation controller 16 establishes parameters for moving the focusing lens 11a in the moving direction at the moving speed over the traveled distance and controls the predriver 17 based on the parameters.

At the time t5 when the movement of the focusing lens 11a is finished, the focusing lens 11a stops moving physically and is held at rest. The time t5 is to precede a next time t1 so that the next time t1 will not come in the period t4 to t5 during which the focusing lens 11a moves. In the period t3 to t5, the focusing lens actuation controller 16 sets the predetermined items to satisfy the above two conditions, and the focusing lens actuation controller 16 sets the parameters depending on the predetermined items.

When the next time t1 is reached after the time t5, the operation as from the time t1 to the time t5 is repeated. When the operation from the time t1 to the time t5 is repeated, the focusing lens 11a is moved successively to the lens positions for successively sampling evaluated values, and evaluated values are acquired successively in those lens positions.

The operation that is periodically performed from the time t1 to the time t5 is in synchronism with the exposure timing of the CMOS sensor in each horizontal synchronizing period. This means that the focusing lens is moved for the successive evaluated value sampling process and the evaluated value is acquired in each horizontal synchronizing process.

According to the present embodiment, the CMOS sensor as the imager is exposed according to the rolling shutter process. For acquiring an evaluated value, the entire area of the captured image from the CMOS sensor is not established, but only a local area of the captured image, i.e., the spatial frequency extracting area 101, is established. Even if the CMOS sensor is normally energized for exposure, the data of the image signal is read for acquiring an evaluated value from only the signal zone including the data of the pixels making up the spatial frequency extracting area 101, the signal zone being indicated as the period t1 to t2. The period t1 to t2 is an exposure period corresponding to the spatial frequency extracting area 101 in the entire exposure period of one captured image. Therefore, the period t1 to t2 is considerably shorter than the time duration corresponding to one horizontal synchronizing period. Consequently, a commensurate quiescent period t2 to t1 is provided between the preceding period t1 to t2 and the next period t1 to t2.

According to the present embodiment, the period in which the focusing lens 11a is to be stopped for obtaining an appropriate evaluated value is the exposure period t1 to t2, and the focusing lens 11a can be moved in the quiescent period t2 to t1. Consequently, the time of the period in which the focusing lens 11a is movable is relatively long. When the successive evaluated value sampling process was performed by the image pickup device 1 according to the present embodiment, the quiescent period t2 to t1 was sufficiently long for moving the focusing lens 11a to a lens position for sampling a next evaluated value.

The exposure timing of the CMOS sensor shown at (a) in FIG. 3 represents a maximum exposure time for one image. If the image pickup device 1 is capable of changing the exposure time depending on exposure settings or the like, then it is possible to set an exposure time shorter than the exposure time of the CMOS sensor shown in FIG. 3.

Figure 4:
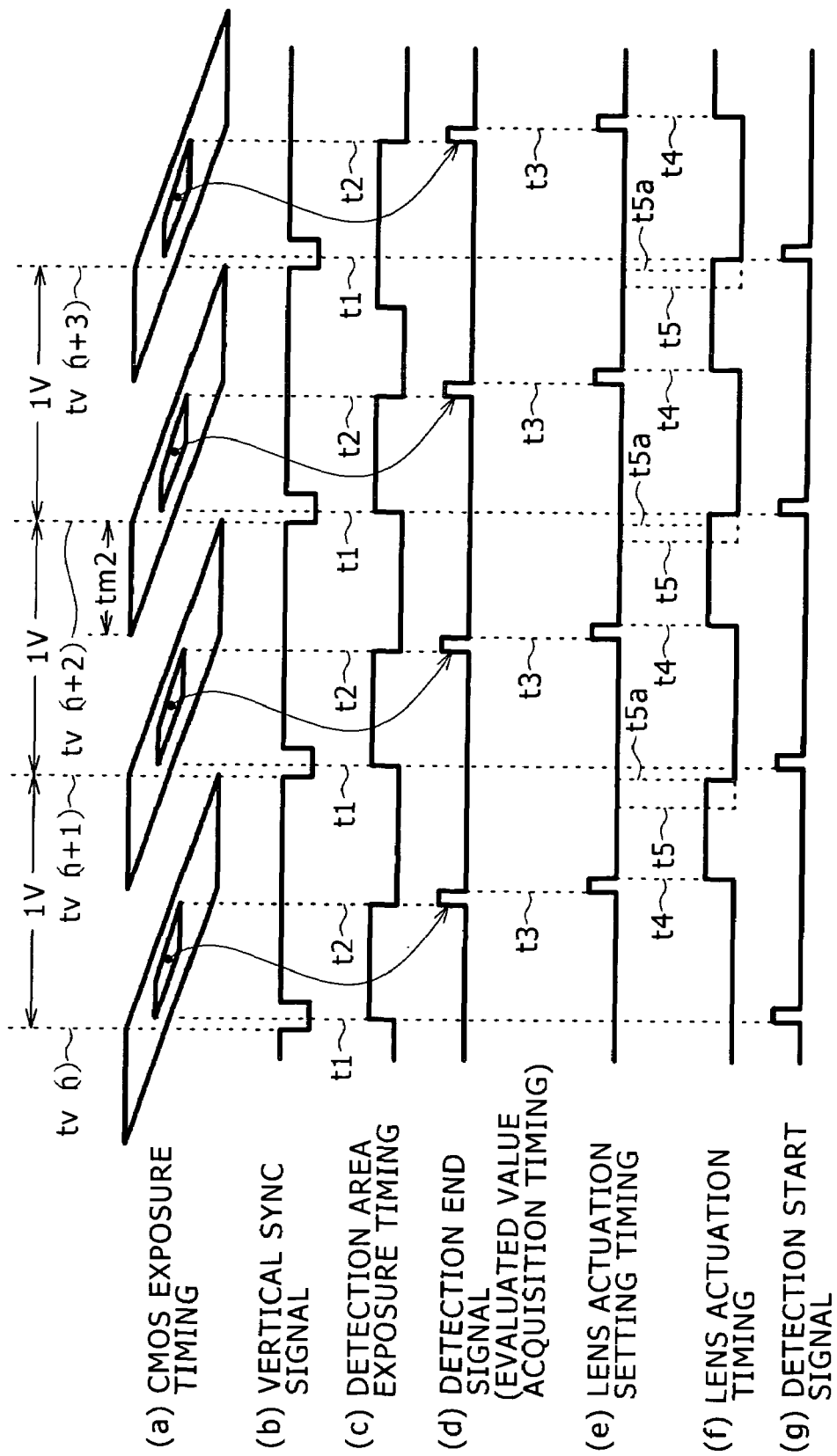
FIG. 4 is a timing chart of a successive evaluated value sampling process for a shorter exposure time according to the embodiment.

FIG. 4 is a timing chart of a successive evaluated value sampling process for a shorter exposure time of the CMOS sensor than the successive evaluated value sampling process shown in FIG. 3. The items (a) through (g) shown in FIG. 4 are identical to those shown in FIG. 3.

The exposure time of the CMOS sensor is represented as the length of a side in a horizontal direction of each larger lozenge shape shown at (a) in FIGS. 3 and 4. The length of the side in the horizontal direction of the larger lozenge shape shown in FIG. 3 is indicated by tm1, and the length of the side in the horizontal direction of the larger lozenge shape shown in FIG. 4 by tm2. The length tm1 is greater than the length tm2, showing that the exposure time of the CMOS sensor shown in FIG. 4 is shorter than the exposure time of the CMOS sensor shown in FIG. 3.

Even though the exposure time of the CMOS sensor shown in FIG. 4 is shorter, the final pixels are read and reset in synchronism with the respective negative-going edges of vertical synchronizing pulses at respective times tv(n), tv(n+1), tv(n+2), tv(n+3) according to the exposure timing for each of the successive captured images. Consequently, the exposure timing for each of the successive captured images is also synchronized with the vertical synchronizing period 1V.

If the CMOS sensor is energized for the shorter exposure time, the exposure period t1 to t2 corresponding to the spatial frequency extracting area 101 is shown at (c) in FIG. 4. After the signal detection in the spatial frequency extracting area 101 is finished at the time t2, an evaluated value is acquired in the following period t2 to t3 as shown at (d) in FIG. 4, and then lens movement settings are made in the following period t3 to t4 as shown at (e) in FIG. 4. From the time t4, the focusing lens 11a is actually moved to the next lens position.

As shown in FIG. 4, if the exposure time of the CMOS sensor is shortened, then the detection period t1 to t2 corresponding to the spatial frequency extracting area 101 is also reduced. Consequently, the quiescent period t2 to t1 from the time t2 to the next detection period is longer in FIG. 4 than in FIG. 3. However, the period t2 to t3 for obtaining an evaluated value as shown at (d) in FIG. 4 and the period t3 to t4 for making lens movement settings as shown at (e) in FIG. 4 remain the same as those shown in FIG. 3. Therefore, the time duration from the time t4 for starting to move the focusing lens 11a to the time t5 for starting the next detection period during the quiescent period t2 to t1 is longer in FIG. 4 than in FIG. 3. This means that the time duration in which the focusing lens 11a can actually be moved in a period corresponding to one horizontal synchronizing period becomes longer.

According to the present embodiment, though the time duration in which the focusing lens 11a can actually be moved is variable, the time duration for moving the focusing lens 11a may be set to a fixed value.

Conversely, based on the fact that the time duration in which the focusing lens 11a can actually be moved is variable, the time duration for moving the focusing lens 11a may be set to a variable value.

For example, the period in which the focusing lens 11a is actually moved is represented as a high-level interval as shown at (f) in FIG. 4. At (f) in FIG. 4, the high-level interval t4 to t5 is of the same time duration as the period t4 to t5 in which the focusing lens 11a is moved as shown at (f) in FIG. 3. The period t4 to t5 in which the focusing lens 11a is actually movable as shown at (f) in FIG. 3 is set to a maximum time duration. At (f) in FIG. 4, a longer time is available from the time t5 to the next time t1 when the next detection period begins. In FIG. 4, therefore, the focusing lens actuation timing is set to start at the time t4 and end at a time t5a which is later than the time t5, so that the focusing lens 11a is moved for a longer period of time. Accordingly, based on the fact that the time duration in which the focusing lens 11a can actually be moved is increased, the time duration for moving the focusing lens 11a actually is set to a variable value.

Figure 5:
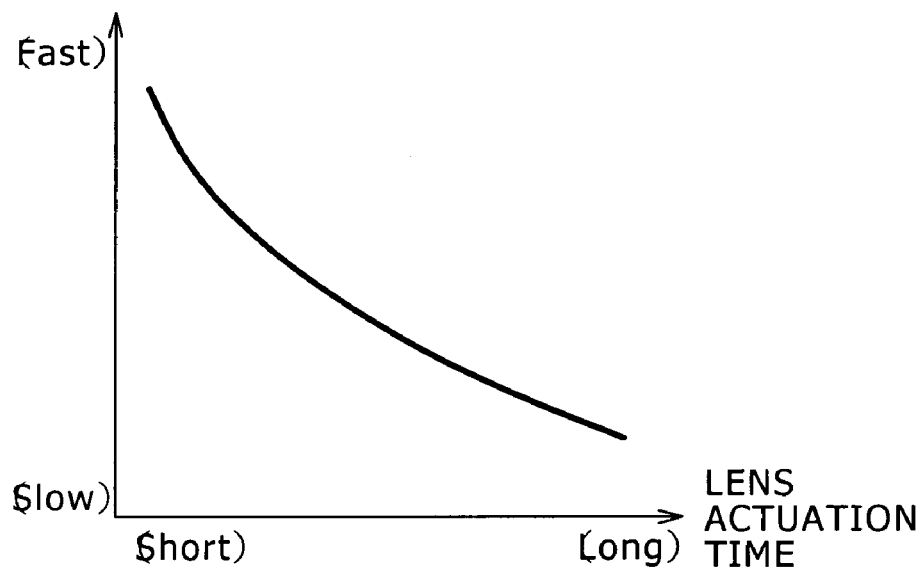
FIG. 5 is a diagram showing the relationship between lens actuation (movement) times and lens actuation (movement) speeds according to the embodiment.

The longer period in which to move the focusing lens 11a to a lens position for sampling an evaluated value offers the following advantages:

FIG. 5 shows the relationship between lens actuation (movement) times and lens actuation (movement) speeds in the condition that the focusing lens 11a is moved a constant distance. In FIG. 5, the horizontal axis represents lens movement times and the vertical axis lens movement speeds.

As shown in FIG. 5, on the assumption that the distance over which the focusing lens 11a is to be moved is constant, the lens movement speed needs to be higher as the lens movement time is shorter, and conversely, the lens movement speed needs to be lower as the lens movement time is longer.

Figure 6:
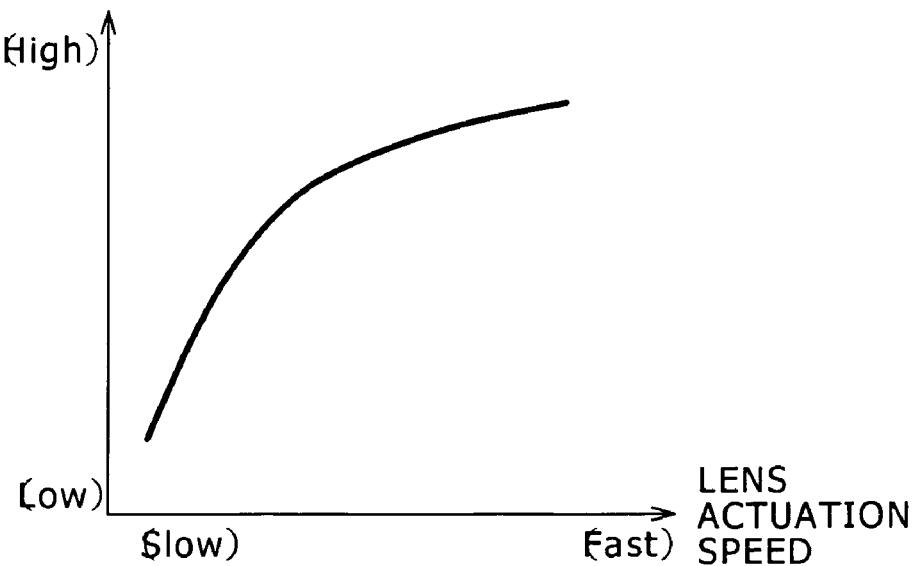
FIG. 6 is a diagram showing the relationship between electric power levels for a motor and lens actuation (movement) speeds.

FIG. 6 shows the relationship between electric power levels for the focusing motor and lens movement speeds. In FIG. 6, the horizontal axis represents lens movement speeds and the vertical axis electric power levels for the focusing motor.

As shown in FIG. 6, the electric power level required per unit time for energizing the focusing motor is greater as the lens movement speed is higher, and conversely, the electric power level required per unit time for energizing the focusing motor is smaller as the lens movement speed is lower.

According to the present embodiment, the focusing lens is usually moved over equal distances divided in the lens movement range to different lens positions for sampling evaluated values. The distance that the focusing lens 11a is moved in one lens actuation cycle remains the same in FIGS. 3 and 4. According to the successive evaluated value sampling process shown in FIG. 4, the lens movement time is longer. Based on the relationship shown in FIG. 5, therefore, the focusing lens 11a is moved at a lower speed in FIG. 4 than in FIG. 3. As can be seen from FIG. 6, if the focusing lens 11a is moved at a lower speed, then the electric power level required per unit time for the focusing motor is lower.

According to the present embodiment, therefore, the timing for moving the focusing lens is variably set in order to provide as long a focusing lens actuation time as possible depending on the exposure time of the CMOS sensor, thereby reducing the amount of electric power consumed to actuate the focusing lens compared with the fixed timing for actuating the focusing lens. As a result, the consumption of electric power is reduced. If the image pickup device 1 is energizable by electric power supplied from a battery, then the consumption of electric power of the battery is reduced, allowing the battery to be used for a longer period of time.

If the focusing lens 11a is moved at a lower speed, then the time in which the focusing motor 19a is supplied with electric power is increased depending on the time in which the focusing lens 11a is moved. However, as shown in FIG. 6, the focusing lens actuation speed and the electric power for the focusing motor are not proportional to each other, but a change in the electric power for the focusing motor depends upon the focusing lens actuation speed more than the focusing lens actuation time. Accordingly, though the focusing lens movement time is longer, the consumed amount of electric power is reduced when the focusing lens 11a is moved at a lower speed.

According to the description of FIGS. 3 and 4, in the successive evaluated value sampling process, the detection timing (and the timing for acquiring the evaluated value and the timing for making lens actuation settings) with respect to the detection area (spatial frequency extracting area 101) should be variably set depending on the exposure time of the CMOS sensor. Furthermore, the focusing lens movement time is variable depending on the exposure time.

Therefore, the image pickup device 1 changes the detection timing for the spatial frequency extracting area 101 depending on the set exposure time, and also changes the focusing lens movement time to actuate the focusing lens.

Figure 7:
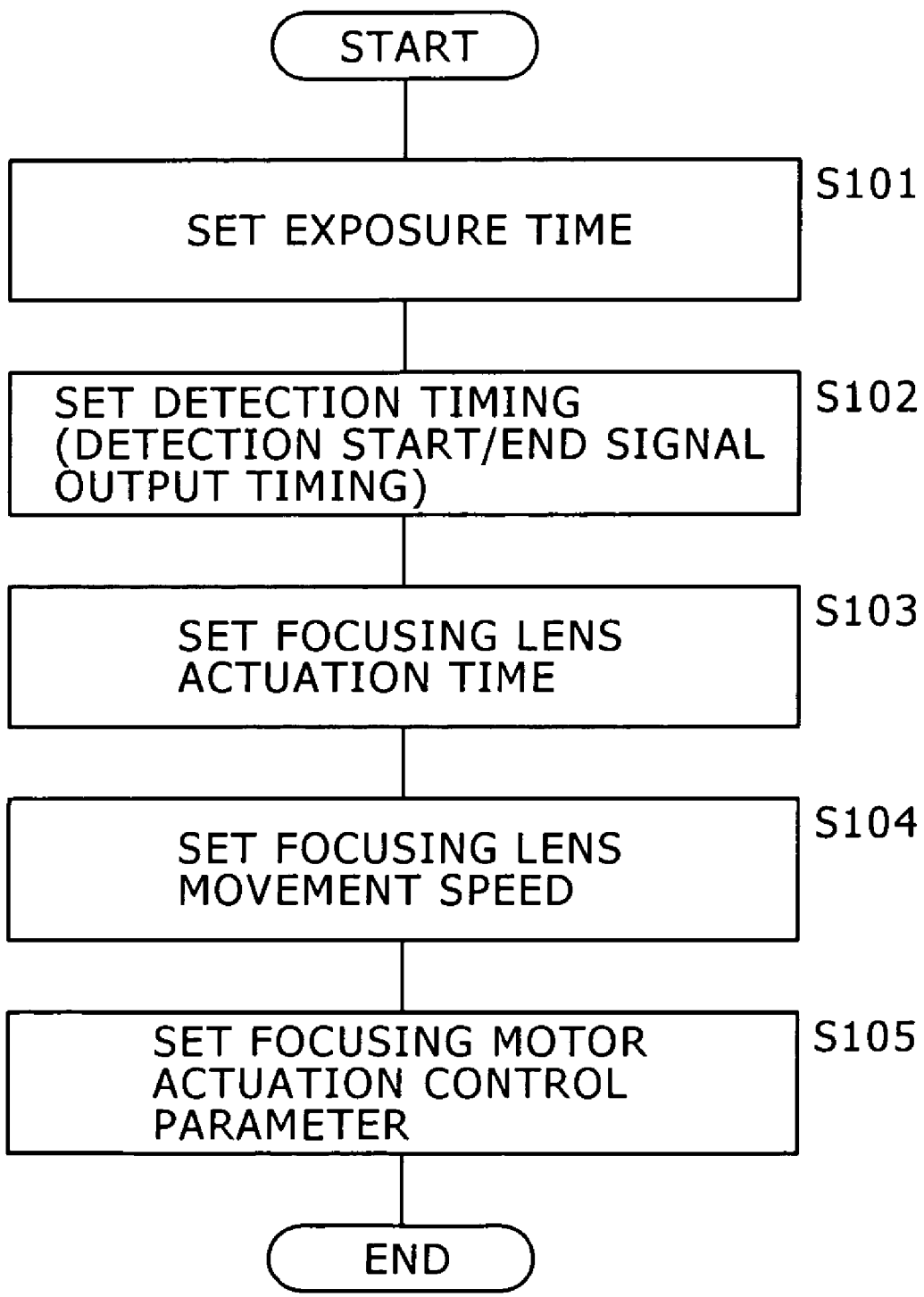
FIG. 7 is a flowchart of a process for setting the timing to actuate a focus lens depending on an exposure time setting according to the embodiment.

Such a processing sequence is shown in FIG. 7. The processing sequence shown in FIG. 7 may primarily be regarded as a process that is performed by the timing generator 20 and the focusing lens focusing lens actuation controller 16 (see FIG. 1) in coaction with each other. If the timing generator 20 and the focusing lens focusing lens actuation controller 16 are implemented as functions performed when the CPU executes the program, then the processing sequence may be regarded as a process that is performed when the CPU executes the program.

In FIG. 7, after the processing sequence starts, the exposure time of the CMOS sensor is set in step S101. The exposure time of the CMOS sensor is set by an automatic exposure adjustment process or a manual exposure adjustment process performed by the user. The timing generator 20 shown in FIG. 1 generates and outputs a CMOS sensor energization signal to the imager 12 so that the CMOS sensor of the imager 12 will operates according to the exposure time set in step S101.

After the exposure time is set, the timing generator 20 generates pulses as a detection start signal (see (g) in FIGS. 3 and 4) and a detection end signal (see (d) in FIGS. 3 and 4) at the times t1, t2 for detecting signals in the spatial frequency extracting area 101 in step S102. Now, the exposure timing in the period t1 to t2 is set as shown in FIGS. 3 and 4. The times t1, t2 can be determined from the exposure time corresponding one captured image, the actual time duration set as the vertical synchronizing period, and the positional information of the pixels that make up the spatial frequency extracting area 101 in one captured image.

It is assumed that the time duration of the period t2 to t3 for acquiring an evaluated value as shown at (d) in FIGS. 3 and 4 and the time duration of the period t3 to t4 for actuating the focusing lens as shown at (e) in FIGS. 3 and 4 are constant regardless of the exposure time. Therefore, when the exposure timing is set in step S102, the period t2 to t3 for acquiring an evaluated value and the period t3 to t4 for actuating the focusing lens are uniquely set.

In step S103, the focusing lens actuation controller 16 sets a focusing lens actuation time, starting from the time t4, for moving the focusing lens 11a to a next lens position to acquire an evaluated value. Specifically, the focusing lens actuation controller 16 sets a time duration from the time t4 to the time t5 in FIG. 3 or a time duration from the time t4 to the time t5 in FIG. 4. The processing of step S103 may be regarded as being executed by the automatic focusing controller 15.

Depending on the times t1, t4 that have been set in step S102, the time duration of the quiescent period t4 to t1 is determined. In step S103, a time duration shorter than the quiescent period t4 to t1 is determined as a duration from the time t4 to the time t5 for moving the focusing lens. The time duration shorter than the quiescent period t4 to t1 may be determined in view of the actual characteristics of the focusing motor and the relationship between the electric power consumed by the focusing motor and the time in which the focusing motor is energized. Actually, a time duration calculated by subtracting a fixed time from the quiescent period t4 to t1 may be set as the focusing lens actuation time. Alternatively, a time duration calculated at a certain ratio to the quiescent period t4 to t1 may be set as the focusing lens actuation time. Further alternatively, table information representative of the relationship between time durations of quiescent period t4 to t1 and time durations of the focusing lens actuation time may be prepared in advance, and an actual focusing lens actuation time may be determined from the table information.

In step S104, the focusing lens actuation controller 16 sets a moving speed for the focusing lens 11a depending on the focusing lens actuation time that has been set in step S103. Since the distance that the focusing lens 11a is to move is already known, the moving speed for the focusing lens 11a can be set based on the focusing lens actuation time that has been set in step S103.

In step S105, the focusing lens actuation controller 16 sets parameters for energizing the focusing motor 19a depending on the moving speed for the focusing lens 11a that has been set in step S104 and other information set by the automatic focusing controller 15, i.e., the distance that the focusing lens 11a is to move and the direction in which the focusing lens 11a is to move. When the parameters are set in the predriver 17, the focusing lens 11a is actuated to move at the set moving speed in the set moving direction in the set focusing lens actuation time (t4 to t5, t4 to t5a).

FIG. 10 is a timing chart of the conventional successive evaluated value sampling process shown in FIG. 9 as it is applied to a CMOS sensor for rolling-shutter exposure as with the imager 12 of the image pickup device 1 shown in FIG. 1. In FIG. 10, the exposure timing of the CMOS sensor is set to a substantially maximum exposure time as shown in FIG. 3.

The exposure timing of the CMOS sensor is shown at (a) in FIG. 10. The exposure timing shown at (a) in FIG. 10 and the timing of the vertical synchronizing signal shown at (b) in FIG. 10 are related to each other in the same manner as shown at (a) and (b) in FIG. 3.

Depending the exposure timing of the CMOS sensor, the exposure timing of the spatial frequency extracting area 101 is set to periods t1 to t5, t7 to t8 as shown at (c) in FIG. 10. The timing of the periods t1 to t5, t7 to t8 shown at (c) in FIG. 10 is the same as the exposure timing of the spatial frequency extracting area 101 in the period t1 to t2 shown at (c) in FIG. 3.

In FIG. 10, an evaluated value is acquired in a period from the time t2 immediately after the preceding vertical synchronizing period 1V is finished and the next vertical synchronizing period 1V is started to the time t3. In a period from the time t3 to the time t4, lens movement settings are made. In a period from the time t4 to the time t6, the focusing lens 11a is actuated to move to a lens position to acquire a next evaluated value.

According to the sequence shown in FIG. 10, the period t1 to t5 representing the exposure period of the spatial frequency extracting area 101 and the period t4 to t6 for moving the focusing lens 11a overlap each other in the period t4 to t5. Stated otherwise, the exposure period of the spatial frequency extracting area 101 includes the period in which the focusing lens 11a is actually moved. Therefore, the image signal produced from the spatial frequency extracting area 101 in the period t4 to t6 cannot be used for sampling an evaluated value.

Consequently, depending on the timing (at the times tv(n+1), tv(n+3)) to start a horizontal synchronizing period in an exposure period t7 to t8 of the spatial frequency extracting area 101 which corresponds to a next horizontal synchronizing period, following the period t1 to t5, an evaluated value in the previous horizontal synchronizing period is not acquired, and the focusing lens 11a is not actuated accordingly. When the timing (at the times tv(n), tv(n+2)) to start the next horizontal synchronizing period is reached, an evaluated value is acquired in the period t2 to t3, lens movement settings are made in the period t3 to t4, and the focusing lens 11a is moved in the period t4 to t6. The above process is repeated until evaluated values in all the lens positions are acquired. According to the sequence shown in FIG. 10, an evaluated value is acquired once in every two vertical synchronizing periods, as with the conventional sequence shown in FIG. 9.

The present invention should not be limited to the illustrated embodiment described above, but changes and modifications may be made as follows:

In the illustrated embodiment, the time t1 in the signal detection period t1 to t2 shown in FIGS. 3 and 4 represents the timing to read the data of a first exposed horizontal line in the spatial frequency extracting area 101 and the time t2 in the signal detection period t1 to t2 represents the timing to read the data of a finally exposed horizontal line in the spatial frequency extracting area 101. However, a signal detection period may be set more strictly so as to extend from the time t1 which represents the timing to read data of a first exposed pixel in the spatial frequency extracting area 101 and the time t2 which represents the timing to read data of a finally exposed pixel in the spatial frequency extracting area 101. Alternatively, timing control may be performed to read the data of pixels which correspond only to the spatial frequency extracting area 101 in the period t1 to t2 shown in FIGS. 3 and 4. Further alternatively, the time t1 may be set to be earlier than the timing to read a first exposed pixel in the spatial frequency extracting area 101, and the time t2 may be set to be later than the timing to read a finally exposed pixel in the spatial frequency extracting area 101. Stated otherwise, the signal detection timing may be set to include a margin for reading pixels around the spatial frequency extracting area 101. According to the latter alternative, the spatial frequency extractor 14 shown in FIG. 1 may be arranged to select the data of pixels that correspond to only the spatial frequency extracting area 101, and an evaluated value may be calculated from the selected data of the pixels.

Therefore, an image signal portion corresponding to the to-be-detected region according to the present invention may be a portion of the image signal corresponding to one captured image, including at least the image signal portion corresponding to the spatial frequency extracting area (to-be-detected region) 101.

The automatic focusing control process based on the contrast method according to the embodiment determines a focused position based on the result of the successive evaluated value sampling process described with reference to FIG. 8. Other contrast methods include a hill-climbing method and a wobble method. According to the hill-climbing method and the wobble method, the acquisition of an evaluated value and the movement of the focusing lens are alternately performed. The present invention is thus also applicable to automatic focusing control processes based on the hill-climbing method, the wobble method, and other contrast methods than the method used in the successive evaluated value sampling process described with reference to FIG. 8.

In the illustrated embodiment, the CMOS sensor is used as the imager. However, the present invention is also applicable to imagers (photoelectric transducers) for exposure according to the rolling shutter (or focal shutter) process, other than the CMOS sensor.

In the illustrated embodiment, the image pickup device 1 has been described as including a digital still camera. However, the image pickup device 1 may include a video camera capable of capturing moving images. The image pickup device 1 may also be applied to cellular phones or other devices having the function of an image pickup device.

Although certain preferred embodiments of the present invention have been shown and described in detail, it should be understood that various changes and modifications may be made therein without departing from the scope of the appended claims.

What is claimed is:

1. A focus control device comprising:
    timing generating means for generating a periodic vertical synchronizing signal that corresponds to an end of an exposure period during which an imager is exposed to generate a single captured image, and generating an image signal reading timing signal to read an image signal portion corresponding to a to-be-detected region of the single captured image, at a focus lens position for acquiring a predetermined evaluated value;
    signal reading means for reading the image signal portion corresponding to the to-be-detected region of the single captured image generated by the imager during the exposure period during which the imager is exposed to generate the single captured image and while at the focus lens position based on the image signal reading timing signal generated by said timing generating means;
    evaluated value acquiring means for generating and acquiring an evaluated value for use in focus control from the image signal portion of the single captured image before the end of the exposure period during which the imager is exposed to generate the single captured image; and
    focusing lens movement control means for moving a focusing lens to the focus lens position for acquiring the evaluated value.

2. The focus control device according to claim 1, wherein said timing generating means changes the image signal reading timing signal depending on an exposure time set for said imager, and said focusing lens movement control means changes movement start/end times depending on the image signal reading timing signal changed by said timing generating means.

3. The focus control device according to claim 2, wherein said focusing lens movement control means changes a speed at which said focusing lens moves in order to change said movement start/end times.

4. The device according to claim 1, wherein the focusing lens movement control means moves the focusing lens to the focus lens position with a movement duration and a movement speed each selected to maximize the movement duration and minimize the movement speed based on the image signal reading timing signal to read the image signal portion corresponding to the to-be-detected region of the single captured image.

5. The device according to claim 1, wherein the focusing lens movement control means starts and ends movement of the focusing lens to the focus lens position during the exposure period during which the imager is exposed to generate the single captured image.

6. The device according to claim 1, wherein the focusing lens movement control means starts moving the focusing lens to the focus lens position after the signal reading means reads the image signal portion corresponding to the to-be-detected region of the single captured image and ends moving the focusing lens to the focus lens position before the end of the exposure period during which the imager is exposed to generate the single captured image.

7. An image pickup device comprising:
a lens unit including a focusing lens;
a focusing lens actuating mechanism for moving said focusing lens;
an imager for outputting an image signal representing a captured image, said imager having imaging elements for detecting image light from said lens unit and converting the image light into an electric signal;
timing generating means for generating a periodic vertical synchronizing signal that corresponds to an end of an exposure period during which the imager is exposed by the image light to generate the captured image, and generating an image signal reading timing signal to read an image signal portion corresponding to a to-be-detected region in an entire area of a captured image, at a focus lens position for acquiring a predetermined evaluated value;
signal reading means for reading the image signal portion corresponding to the to-be-detected region of the captured image generated by said imager during the exposure period during which the imager is exposed to the image light to generate the captured image and while at the focus lens position based on the image signal reading timing signal generated by said timing generating means;
evaluated value acquiring means for generating and acquiring an evaluated value for use in focus control from the image signal portion of the captured image before the end of the exposure period during which the imager is exposed to generate the captured image; and
focusing lens movement control means for controlling said focusing lens actuating mechanism to move said focusing lens to the focus lens position for acquiring the evaluated value at movement start/end times after the image signal portion is read by said signal reading means.

8. The device according to claim 7, wherein the focusing lens movement control means moves the focusing lens to the focus lens position with a movement duration and a movement speed each selected to maximize the movement duration and minimize the movement speed based on the image signal reading timing signal to read the image signal portion corresponding to the to-be-detected region of the captured image.

9. The device according to claim 7, wherein the focusing lens movement control means starts and ends movement of the focusing lens to the focus lens position during the exposure period during which the imager is exposed to generate the captured image.

10. The device according to claim 7, wherein the focusing lens movement control means starts moving the focusing lens to the focus lens position after the signal reading means reads the image signal portion corresponding to the to-be-detected region of the captured image and ends moving the focusing lens to the focus lens position before the end of the exposure period during which the imager is exposed to generate the captured image.

11. A focus control method comprising:
exposing an imager during an exposure period to generate a single captured image;
generating an image signal reading timing signal to read an image signal portion corresponding to a to-be-detected region of the single captured image, at a focus lens position for acquiring a predetermined evaluated value;
reading the image signal portion corresponding to the to-be-detected region of the single captured image generated by the imager during the exposure period during which the imager is exposed to generate the single captured image and while at the focus lens position based on the image signal reading timing signal generated in said generating;
calculating, before the end of the exposure period during which the imager is exposed to generate the single captured image, an evaluated value for use in focus control from the image signal portion of the single captured image; and
moving a focusing lens to the focus lens position for acquiring the evaluated value.

12. The method according to claim 11, further comprising:
moving the focusing lens to the focus lens position with a movement duration and a movement speed; and
selecting the movement duration and the movement speed to maximize the movement duration and minimize the movement speed based on the image signal reading timing signal to read the image signal portion corresponding to the to-be-detected region of the captured image.

13. The method according to claim 11, further comprising:
starting and ending movement of the focusing lens to the focus lens position during the exposure period during which the imager is exposed to generate the captured image.

14. The method according to claim 11, further comprising:
starting movement of the focusing lens to the focus lens position after the reading the image signal portion corresponding to the to-be-detected region of the captured image; and
ending movement of the focusing lens to the focus lens position before the end of the exposure period during which the imager is exposed to generate the captured image.

15. A focus control device comprising:
a timing generating section configured to generate a periodic vertical synchronizing signal that corresponds to an end of an exposure period during which an imager is exposed to generate a single captured image, and generate an image signal reading timing signal to read an image signal portion corresponding to a to-be-detected region of the single captured image, at a focus lens position for acquiring a predetermined evaluated value;

a signal reading section configured to read the image signal portion corresponding to the to-be-detected region of the single captured image generated by the imager during the exposure period during which the imager is exposed to generate the single captured image and while at the focus lens position based on the image signal reading timing signal generated by said timing generating section;

an evaluated value acquiring section configured to calculate, before the end of the exposure period during which the imager is exposed to generate the single captured image, an evaluated value for use in focus control from the image signal portion of the single captured image; and a focusing lens movement control section configured to move a focusing lens to the focus lens position for acquiring the evaluated value.

16. The device according to claim 15, wherein the focusing lens movement control section moves the focusing lens to the focus lens position with a movement duration and a movement speed each selected to maximize the movement duration and minimize the movement speed based on the image signal reading timing signal to read the image signal portion corresponding to the to-be-detected region of the captured image.

17. The device according to claim 15, wherein the focusing lens movement control section starts and ends movement of the focusing lens to the focus lens position during the exposure period during which the imager is exposed to generate the captured image.

18. The device according to claim 15, wherein the focusing lens movement control section starts moving the focusing lens to the focus lens position after the signal reading section reads the image signal portion corresponding to the to-be-detected region of the captured image and ends moving the focusing lens to the focus lens position before the end of the exposure period during which the imager is exposed to generate the captured image.

* * * * *